United States Patent
Pandya et al.

(10) Patent No.: US 9,298,649 B2
(45) Date of Patent: Mar. 29, 2016

(54) METHOD AND APPARATUS FOR DYNAMICALLY UPDATING A VEHICLE MODULE CONFIGURATION RECORD

(71) Applicant: Ford Global Technologies, LLC, Dearborn, MI (US)

(72) Inventors: Ritesh Pandya, Rochester Hills, MI (US); Brian Petersen, Beverly Hills, MI (US); Joseph Paul Rork, Plymouth, MI (US); Praveen Yalavarty, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 14/291,294

(22) Filed: May 30, 2014

(65) Prior Publication Data

US 2015/0347326 A1    Dec. 3, 2015

(51) Int. Cl.
*G01M 17/00*    (2006.01)
*G06F 13/14*    (2006.01)
*G06F 9/445*    (2006.01)

(52) U.S. Cl.
CPC . *G06F 13/14* (2013.01); *G06F 8/65* (2013.01)

(58) Field of Classification Search
CPC .................................. G06F 8/65; G06F 8/71
USPC ...................... 701/31.4, 31.5; 717/170, 173
See application file for complete search history.

(56) References Cited

U.S. PATENT DOCUMENTS

| | | | |
|---|---|---|---|
| 8,335,508 B2* | 12/2012 | Doherty et al. | 455/434 |
| 2004/0203692 A1 | 10/2004 | Schwinke et al. | |
| 2007/0055414 A1 | 3/2007 | Darji | |
| 2010/0228404 A1* | 9/2010 | Link et al. | 701/1 |
| 2011/0320089 A1* | 12/2011 | Lewis | 701/32 |
| 2012/0126963 A1 | 5/2012 | Lewis | |
| 2013/0204466 A1 | 8/2013 | Ricci | |
| 2014/0282467 A1* | 9/2014 | Mueller et al. | 717/170 |

* cited by examiner

*Primary Examiner* — Luke Huynh
(74) *Attorney, Agent, or Firm* — Jennifer M. Stec; Brooks Kushman P.C.

(57) ABSTRACT

A system includes a processor configured to detect that a vehicle module update has been performed. The processor is further configured to create an identifier associated with a module that indicates an updated status and for each module having an identifier indicating an updated status associated therewith, requesting subscription to a topic, corresponding to the updated module, and specific to an individual vehicle, from a remote server.

20 Claims, 3 Drawing Sheets

METHOD AND APPARATUS FOR DYNAMICALLY UPDATING A VEHICLE MODULE CONFIGURATION RECORD

TECHNICAL FIELD

The illustrative embodiments generally relate to a method and apparatus for dynamically updating a vehicle module configuration record.

BACKGROUND

Vehicle telematics systems provide advanced interaction and communication capabilities in the vehicles. They are one of a class of advanced computer-based technologies that have recently been added to vehicles to improve the driving experience. These systems, both the telematics systems and other systems, are commonly comprised of a variety of software, hardware and/or firmware. Like many other computing systems, the software and/or firmware may occasionally be updated to improve functionality and operability.

These updates can come in the form of user-implemented updates, which are done via a local network or through the insertion of a memory stick into the vehicle. Dealers may also update the modules when the vehicle is brought in for servicing. In other cases, over the air (OTA) updates may be used to update the vehicle. Typically, when an update is performed via the OTA updates, the backend system that generates updates for the vehicle will know that the update was processed, as part of the OTA update process. But, if a user implements an update, or if a dealer implements an update, there may not be a remote record of the update that the backend system can access. Then, when the backend system creates an update for the vehicle, the update may be based on bad information relating to a current configuration of the vehicle's software and/or firmware.

U.S. Patent Application 2012/0126963 generally relates to systems and methods for occupant reporting of a vehicle issue over-the-air from within a vehicle include a cellular device in the vehicle that establishes a connection with a cellular network. A user interface includes a display that provides occupant selectable menu options for reporting a vehicle issue. A processing system generates issue data based on a selected menu option. The issue data is selectably provided to one or more issue receiving servers including a first issue receiving server associated with a first organization and a second issue receiving server associated with a second, different organization using the cellular network.

U.S. Patent Application 2013/0204466 generally relates to a microprocessor executable remote control module operable to receive, via a remote node, a command from a vehicle owner to configure and/or alter and/or determine a state of a selected vehicle component and, when the vehicle owner is authenticated successfully by the remote control module, to configure and/or alter and/or determine a state of the selected vehicle component.

SUMMARY

In a first illustrative embodiment, a system includes a processor configured to detect that a vehicle module update has been performed. The processor is further configured to create an identifier associated with a module that indicates an updated status and for each module having an identifier indicating an updated status associated therewith, requesting subscription to a topic, corresponding to the updated module, and specific to an individual vehicle, from a remote server.

In a second illustrative embodiment, a system includes a processor configured to receive a request from a vehicle computer to subscribe to a topic associated with an updated vehicle module. The processor is also configured to determine that the topic does not already exist for the specific requesting vehicle and, based on receipt of the request and the determination that the topic does not exist, create a vehicle-specific topic corresponding to the updated module.

In a third illustrative embodiment, a computer-implemented method includes receiving a request from a vehicle computer to subscribe to a topic associated with an updated vehicle module. The method also includes determining, via a computer, that the topic does not already exist for the specific requesting vehicle, and, based on receipt of the request and the determination that the topic does not exist, creating a vehicle-specific topic corresponding to the updated module.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
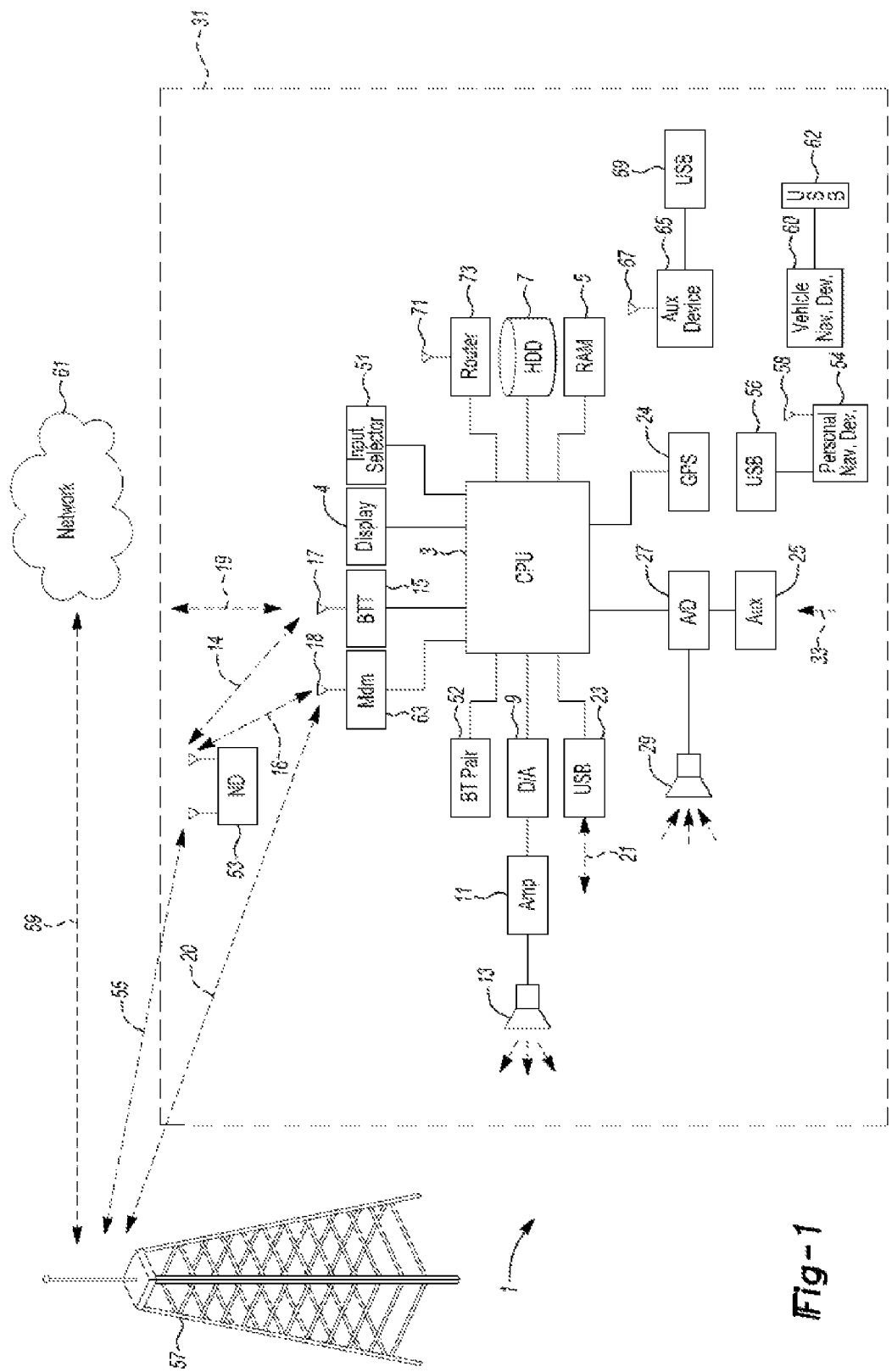
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touch screen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

In the illustrative embodiments, it is desirable to notify a remote server that a user has updated a vehicle software or firmware module, through user implementation or through use of a dealer. If the remote server, which is, in this instance, an update server, that provides updates for the vehicle's software and firmware, does not know the current vehicle configuration, updates can be based on bad information and errors may occur when attempting to update a system that has a different configuration than expected.

When a vehicle module is updated, it can communicate with a the remote server and request subscription to a topic. The topic will be a topic that is based on the module's current configuration. When a vehicle module, having a new configuration, requests subscription to a topic correlating to that configuration, such a topic will not currently exist (since the back-end server did not know of the configuration). As a result, a topic will be created that corresponds to the current vehicle configuration.

Once the topic has been created, and the backend system sees that the topic is based on a configuration different than that expected of the vehicle module, the backend system will know that the vehicle has been reconfigured and updated. Future updates for the vehicle can then be provided in accordance with the new configuration.

Figure 2A:
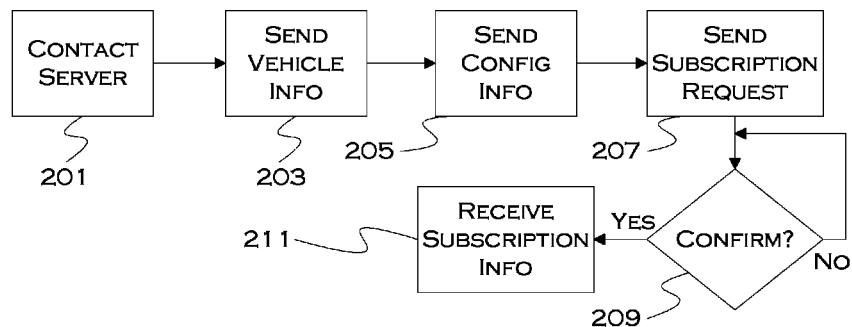
FIG. 2A shows an illustrative process for subscribing to a configuration topic.

FIG. 2A shows an illustrative process for subscribing to a configuration topic. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative process, the vehicle system seeks to register for a new topic based on an update to a vehicle software or firmware module. This will assist a back-end system in knowing that an update has been performed to the vehicle software or hardware.

The local system communicates with a backend server for purposes of subscribing to a new topic 201. Communication may be performed through a wireless device connected to the vehicle and the remote system. In other examples, the process may communicate through a modem installed in the vehicle.

Once a connection has been established to the remote server, the process can send vehicle identifying information 203. While a new topic is created based on a vehicle configuration, it is specific to that vehicle. Which is to say, if two vehicles have the exact same module configuration, they will not subscribe to the exact same topic. The purpose of the topic is at least to alert the back-end system that a change has occurred in the vehicle configuration. As such, in this example, the topics are specific to specific vehicles. Accordingly, the vehicle information is sent to the remote server to identify the vehicle. This can be any information that identifies the vehicle, such as a vehicle identification number (VIN) a system serial number, or any other unique identifying information.

The process also sends module configuration information 205. This is an identifier that identifies which version of software is installed in one or more software and/or firmware modules. This is the information that will be used to create a new topic identifying for the back-end server the current module(s) configuration. In one example, this is information created when an update is installed in the module. In some cases, this may only be created if the module is manually updated (i.e., not through an original equipment manufacturer (OEM) originated process). For example, if a software having current configuration [2.2Mobile[1.2.3] was upgraded, an identifier [2.2Mobile[1.2.3.m] may be created. This identifier may be passed to the remote server.

The process also sends a subscription request, requesting to subscribe to a topic that corresponds to the current configuration [2.2Mobile[1.2.3.m] (or whatever the current configuration is) 207. The subscription request triggers an attempt on the back-end server for the vehicle to subscribe to the requested topic. Since the topic does not actually exist (presumably), the subscription request should result in a new topic creation. The system then waits for confirmation that the request has been processed 209. Once confirmation has been received, the local process receives subscription information 211.

Other uses may exist for the subscription topics. They can be used to notify the system of vehicle updates and other changes to the configuration. Other uses of the topics beyond notifying the remote system of changes to a current vehicle configuration are beyond the scope of this disclosure.

Figure 2B:
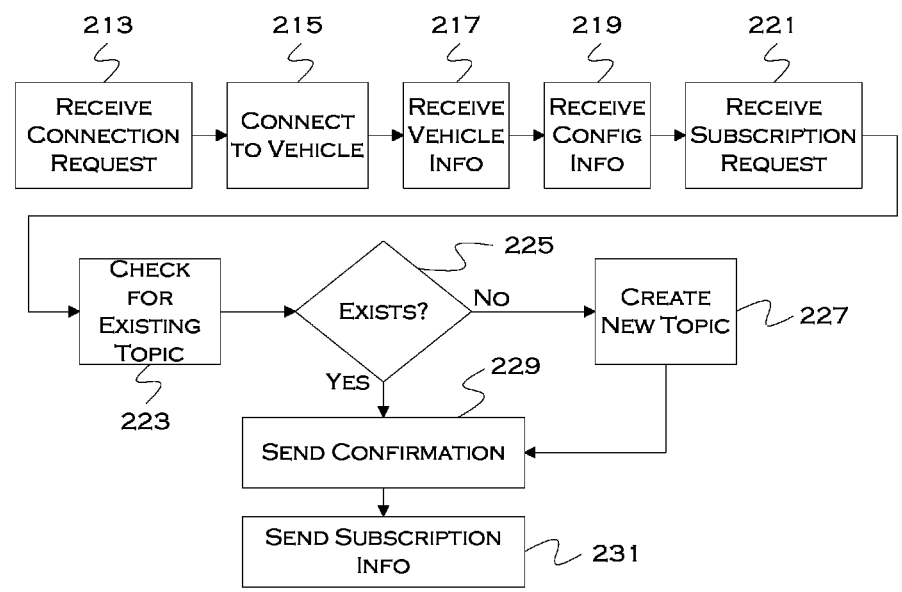
FIG. 2B shows an illustrative process for creating a configuration topic.

FIG. 2B shows an illustrative process for creating a configuration topic. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this process, the server-side process for creation of the new topic is shown. This is an illustrative process only, and should not limit the invention in any manner. The server-side process receives a connection request from a vehicle-side process 213. Once a connection has been established between the server and the vehicle 215, the process receives the vehicle identifying information 217. Using this information, any previously saved data relating to the vehicle can be obtained.

The process also receives configuration information, relating to the configuration of the software/firmware modules 219. As previously noted, this can include an identification of the current software/firmware version installed on the vehicle computing system. The process also receives a subscription request 221 from the vehicle, requesting to subscribe to a topic that corresponds to the software version identifier.

Since there may have been a situation where this topic was already created, such as a partially completed previous subscription request, or other reporting of the current vehicle configuration through a different manner (e.g., the dealer reported the update), the topic may already exist (i.e., the back-end server may already know of the configuration). Accordingly, the server checks for the existence of an appropriately named topic 223. Presumably, the vehicle will not have managed to subscribe to this topic yet, hence the request. If the topic is used for any other purpose, it may still be desirable to have the vehicle subscribe to the topic.

If the topic currently exists 225, the process sends a confirmation to the subscription request 229 and subscribes the vehicle to the topic. The subscription information is then sent to the vehicle 231. If the topic does not exist, a topic named after the current configuration is dynamically created, based on the subscription request 227. Again, a confirmation is sent 229 and subscription information is also sent 231.

Figure 3:
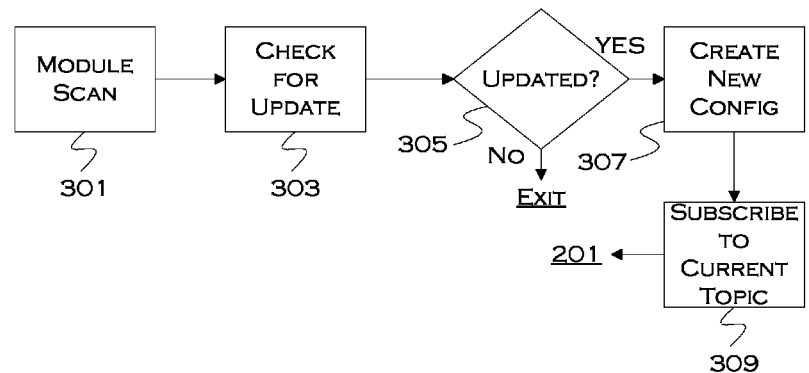
FIG. 3 shows an illustrative process for launching a subscription process.

FIG. 3 shows an illustrative process for launching a subscription process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this exemplary process, the local vehicle system will create new software version identifiers that designate the appropriateness of software updates for requesting new topic subscription.

The process scans through modules that may have had updates applied thereto 301. Updates can be designated by an update flag or by any appropriate other designation. In at least one example, this new version designation may be done automatically when the update is applied, however, this process addresses the instance where the version has not yet been created. Further, even if a new version is applied, portions of this process may still be used to generate the request for a new subscription topic.

In this example, the process scans for modules that currently exist on the system 301. For each module that is found, the process checks to see if an update exists 303. The update could be designated in any manner that is appropriate, including the creation of the previously suggested exemplary .m version identifier.

If no updates exist, the process simply exits. If updates exist, however, the process will, in this example, create the new identifier for each of the updated modules 307. This is assuming, of course, that the identifier does not already exist and was not the method through which the update was identified. In that case, no creation of the identifier is needed.

For each new identifier that exists/was created, the process sends a subscription request to subscribe to a topic corresponding to that identifier 309. This can be a single request identifying all of the new topics, or can be individual requests for each of the identifiers individually. This leads to the process shown in FIG. 2, for example.

Figure 4:
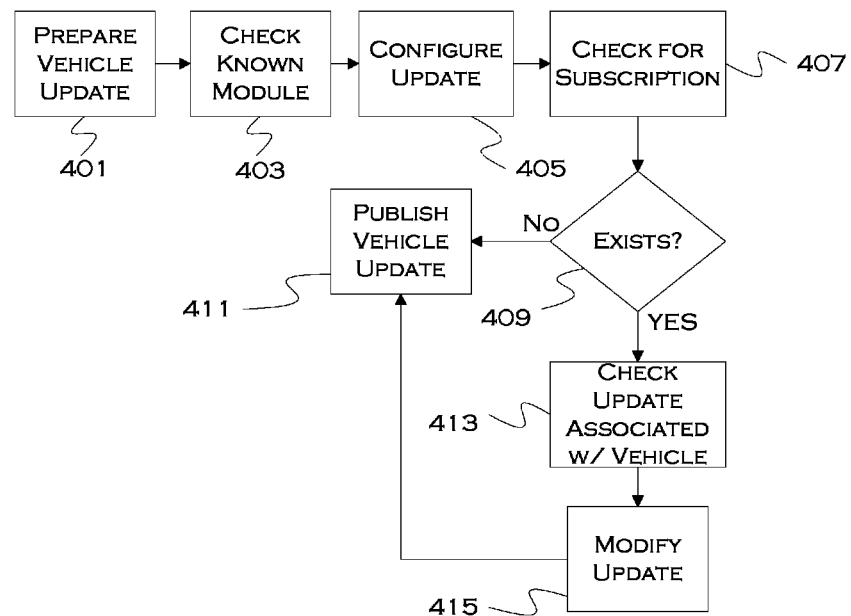
FIG. 4 shows an illustrative process for publishing a vehicle update.

FIG. 4 shows an illustrative process for publishing a vehicle update. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative process, the remote server uses the topic identifier to configure an update for the vehicle. In common practice, as new updates have been developed for software and/or firmware, the server can customize these updates for each vehicle based on current vehicle software configurations. For example, some software configurations branch, based on user selections, so that two parallel versions of an update to version 1.2 might be 1.2A and 1.2B. A future update to each might then be version 1.2A.1 and 1.2B.1. If the system thought that the vehicle contained version 1.2, it might recommend update 1.2A.1 to get the user to the end of the update chain along version 1.2A. But if the user has already installed version 1.2B, attempting to install 1.2A.1 might result in some unexpected results. To avoid this, it is useful for the configuration and update server to know what current version of software exists on the vehicle. This avoids user confusion at the unexpected results and avoids unnecessary trips to the dealer.

In this example, the process prepares a vehicle update 401. When a new software module is developed by an OEM, the process will attempt to update all the vehicles that have the corresponding software module. The process checks to see if a given vehicle has the module that corresponds to the updated module 403. The update is then configured for the module 405.

This process can be done in different order if desired, such as checking for the updated version information prior to configuring the module, this is just one exemplary manner of carrying out the process to demonstrate the illustrative embodiments.

The process also checks to see if a subscription is associated with the software module 407. If a subscription having a ".m" (or other suitable identifier) exists 409, the process knows that an updated software version has been installed. This may require reconfiguration of the update, or may make the update altogether pointless.

If the new version exists, the process will check the updated version to determine which of the module versions of software have been installed by the user/dealer 413. This will allow the process to modify the update accordingly 415, to allow the process to implement a proper version of the update. The vehicle update, modified or unmodified, is published as appropriate 411, for use by the vehicle. In one example, although not described in greater detail, the update is actually published to the topic to which the vehicle subscribes (e.g., the topic having an identifier corresponding to the current software version).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to:
   detect that a vehicle module update has been performed;
   create an identifier associated with a module that indicates an updated status; and
   for each module having an identifier indicating an updated status associated therewith, requesting subscription to a topic, corresponding to the updated module, and specific to an individual vehicle, from a remote server.

2. The system of claim 1, wherein the module is a software module.

3. The system of claim 1, wherein the module is a firmware module.

4. The system of claim 1, wherein the topic is identified by the same name as the identifier.

5. The system of claim 1, wherein the processor is further configured to receive confirmation from the remote server that the subscription request was successful.

6. The system of claim 1, wherein the identifier comprises a previous identifier name identifying a previous module version, having indicia appended thereto indicating the updated status.

7. A system comprising:
   a processor configured to:
   receive a request from a vehicle computer to subscribe to a topic associated with an updated vehicle module;
   determine that the topic does not already exist for the specific requesting vehicle; and
   based on receipt of the request and the determination that the topic does not exist, create a vehicle-specific topic corresponding to the updated module.

8. The system of claim 7, wherein the vehicle module is a software module.

9. The system of claim 7, wherein the vehicle module is a firmware module.

10. The system of claim 7, wherein the topic is named based on an identifier associated with the updated module.

11. The system of claim 10, wherein the identifier comprises a previous identifier name identifying a previous module version, having indicia appended thereto indicating the updated status.

12. The system of claim 7, wherein the topic identifies a current module version for a specific vehicle.

13. The system of claim 12, wherein the topic name identifies the current module version.

14. A computer-implemented method comprising:
   receiving a request from a vehicle computer to subscribe to a topic associated with an updated vehicle module;
   determining, via a computer, that the topic does not already exist for the specific requesting vehicle; and
   based on receipt of the request and the determination that the topic does not exist, creating a vehicle-specific topic corresponding to the updated module.

15. The method of claim 14, wherein the vehicle module is a software module.

16. The method of claim 14, wherein the vehicle module is a firmware module.

17. The method of claim 16, wherein the topic is named based on an identifier associated with the updated module.

18. The method of claim 17, wherein the identifier comprises a previous identifier name identifying a previous module version, having indicia appended thereto indicating the updated status.

19. The method of claim 14, wherein the topic identifies a current module version for a specific vehicle.

20. The method of claim 19, wherein the topic name identifies the current module version.

* * * * *